United States Patent [19]

Tokumaru et al.

[11] Patent Number: 5,323,481
[45] Date of Patent: Jun. 21, 1994

[54] OPTICAL FIBER CLAMP FOR HOLDING A PLURALITY OF OPTICAL FIBERS OF VARYING DIAMETERS

[75] Inventors: Yuzo Tokumaru; Toru Yanagi, both of Kanagawa, Japan

[73] Assignee: Sumitomo Electric Industries, Ltd., Osaka, Japan

[21] Appl. No.: 54,136

[22] Filed: Apr. 30, 1993

[30] Foreign Application Priority Data

May 1, 1992 [JP] Japan .................. 4-112500

[51] Int. Cl.⁵ .................................. G02B 6/26
[52] U.S. Cl. ..................... 385/136; 385/81; 385/137
[58] Field of Search ............ 385/59, 71, 62, 81, 385/87, 89, 136, 137, 139, 95–99

[56] References Cited

U.S. PATENT DOCUMENTS

| | | | |
|---|---|---|---|
| 4,211,470 | 7/1980 | Stewart | 385/55 |
| 4,475,790 | 10/1984 | Little | 385/55 |
| 4,750,804 | 6/1988 | Osaka et al. | 385/55 |
| 5,134,673 | 7/1992 | Stephenson et al. | 385/56 |
| 5,146,532 | 9/1992 | Hodge | 385/136 |
| 5,159,655 | 10/1992 | Ziebol et al. | 385/81 |

FOREIGN PATENT DOCUMENTS

| | | |
|---|---|---|
| 0324272 | 7/1989 | European Pat. Off. |
| 0462710 | 12/1991 | European Pat. Off. |
| 4123227 | 7/1992 | Fed. Rep. of Germany |

*Primary Examiner*—Frank Gonzalez
*Attorney, Agent, or Firm*—Cushman, Darby & Cushman

[57] ABSTRACT

An optical fiber clamp, having a plurality of V-shaped grooves, stores coated optical fibers in the respective V-shaped grooves. The coated optical fibers are held by a pressing force of the clamp. A cushion portion, having an abrasion-resistant smooth film layer, is provided on the side of an optical fiber pressing surface of the clamp. The cushion portion applies a constant pressure to the optical fibers through the abrasion-resistant smooth film layer and absorbs any differences in the outer diameters and other dimensional peculiarities of the optical fibers. Thus, the optical fibers in the V-shaped grooves can be arranged and held uniformly, so that a batch fusion and connection can be performed on a multicore fiber with a minimum loss of connection. The optical fiber clamp minimizes axial displacements of respective optical fibers.

6 Claims, 2 Drawing Sheets

OPTICAL FIBER CLAMP FOR HOLDING A PLURALITY OF OPTICAL FIBERS OF VARYING DIAMETERS

BACKGROUND OF THE INVENTION

1. Field of the Invention

The present invention relates to an optical fiber clamp for holding a batch of coated optical fiber tape and, in particular, to an optical fiber clamp for adjusting axis of optical fibers with high accuracy, to fuse the optical fibers and connect all of the optical fibers to each other at once.

2. Background Information

Conventional methods of fusing and connecting respective optical fibers of a coated optical fiber tape include first removing the coatings from the optical fiber. Thereafter, an optical fiber clamp 10 such as that shown in FIGS. 5(A) and 5(B) is used.

The optical fibers 13 are arranged one by one into a plurality of V-shaped grooves 11 formed in the body 12. Thereafter, a clamp 14 is used to give a pressing force to the optical fibers 13 to hold them in place.

To fuse and connect multicore optical fibers all at once, it is necessary to perform a push/pull operation upon each optical fiber by use of the above-mentioned optical fiber clamp.

A surface of the optical fiber clamp coming in contact with the respective optical fibers 13 is made smooth so that the respective centers of the optical fibers 13 will not shift with respect to each other even when this push/pull operation is performed.

The optical fiber clamp 14 is made of heat-proof material which is durable against a discharge arc at the time of fusing. At the same time, the optical fiber clamp 14 is made of a hard material to maintain the position relationship between itself and the V-shaped grooves.

In the conventional methods discussed above, a problem arises that large displacement differences are often produced both between the axial alignment of optical fibers with respect to optical fibers opposite thereto and between the axial displacement of optical fibers with respect to optical fibers adjacent thereto. The large displacement differences occur because the outer diameters of the optical fibers themselves vary because of the dimensional irregularities in the optical fibers, and because the clamp itself is a rigid body.

When, for example, a plurality of optical fibers are to be connected at once, it is impossible to press all of the optical fibers into the V-shaped grooves uniformly under the same condition. In some cases, the maximum allowable axial displacements of the optical fibers may only be 6 $\mu$m. As a result, the problem arises that the loss of connection is not less than 0.2 dB.

SUMMARY OF THE INVENTION

It is an object of the present invention to provide an optical fiber clamp from which respective axial displacements of optical fibers can be minimized when a multicore optical fiber is to be subjected to a batch fusion connection.

The optical fiber clamp according to the present invention attains the foregoing object with an optical fiber clamp having a cushion portion. An abrasion-resistant smooth film layer is provided on the side of the cushion portion on the optical fiber pressing surface of the clamp.

Other objects, features and characteristics of the present invention, as well as the methods of operation and functions of the related elements of the structure, and the combination of parts and economies of manufacture, will become more apparent upon consideration of the following detailed description and the appended claims with reference to the accompanying drawings all of which form a part of this specification, wherein like reference numerals designate corresponding parts in the various figures.

DETAILED DESCRIPTION OF THE PRESENTLY PREFERRED EXEMPLARY EMBODIMENTS

Figure 1:
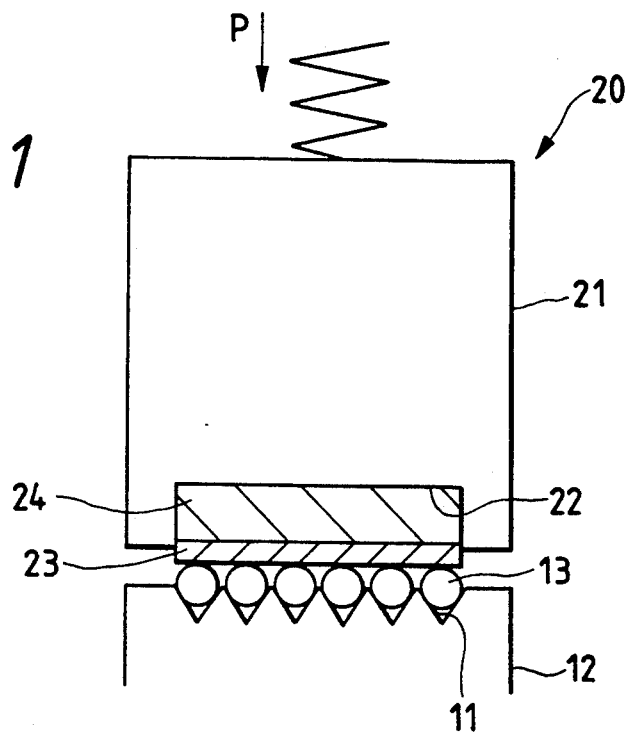
FIG. 1 is a schematic diagram of an optical fiber clamp according to an embodiment of the present invention.

An optical fiber clamp with a cushion layer having an abrasion resistant smooth film layer is shown by way of example, in FIG. 1. The optical fiber clamp 20 includes a concave portion 22 formed on the side of the optical fiber pressing surface of the clamp body 21. A cushion portion 24 having a smooth film layer 23 is provided on the side of the optical fiber contact surface in this concave portion 22.

Optical fibers 13 of a multicore fiber are inserted into respective V-shaped grooves 11 formed in a V-shaped grooved body 12. The optical fibers 13 are then pressed by use of a clamp body 21.

The cushion portion 24 serves to absorb the differences in the outer diameters and other dimensional peculiarities of the optical fibers 13. The cushion portion 24 may be formed of a foamed synthetic cushion material. In this embodiment, the thickness of the cushion portion 24 is set to be from 2 mm to 3 mm, and a cushion tape, having bonding layers (not shown), is used on both sides of the cushion portion 24.

The film layer 23 is preferably made to have high degree of smoothness because it is brought into contact with the optical fibers 13. Further, it preferably has a heat resistance high enough to be durable against a discharge arc. In this embodiment, a Teflon film with a thickness of not more than 300 $\mu$m is used as the heat-proof smooth film layer 23.

After a plurality of optical fibers are inserted into the V-shaped grooves, the clamp 20, provided with the cushion portion 24, having an abrasion-resistant smooth film layer 23 on the side of its optical fiber pressing surface, is used to absorb the scattering of outer diameters and other dimensional peculiarities of the optical fibers through the cushion function of the cushion portion. The clamp, thus, applies a constant pressure to the optical fibers through the abrasion-resistant smooth film layer to thereby arrange and hold the optical fibers in the V-shaped grooves uniformly.

Figure 2:
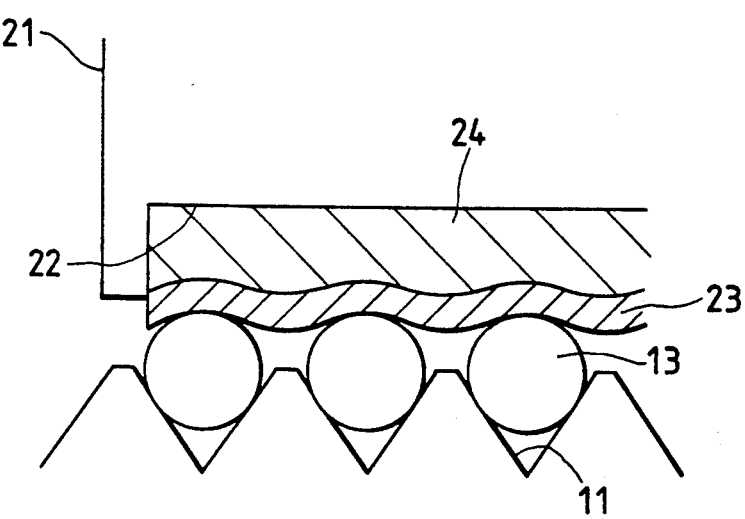
FIG. 2 is an enlarged diagram of a portion of FIG. 1.

As a result, differences in the outer diameters and other dimensional peculiarities of the optical fibers 13 can be absorbed on the basis of the cushion effect of the cushion portion 24 as shown in FIG. 2. The highly smooth film layer 23 provides a necessary constant uniform force to the respective fibers 13. Accordingly, the optical fibers 13 can be arranged and held in the V-shaped grooves, such that the axial displacements of the respective optical fibers can be minimized to reduce the loss of connections when a multicore fiber is to be subjected to a batch fusion connection.

Figure 3:
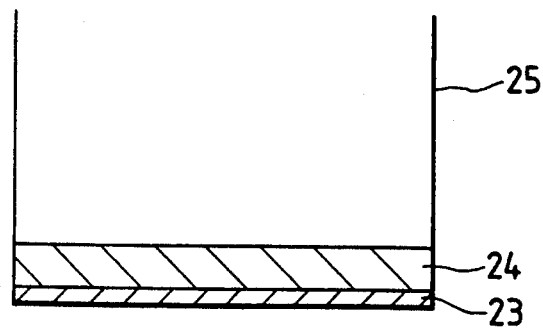
FIG. 3 is a schematic diagram of a clamp body according to another embodiment of the present invention.

The embodiment described above shows that the concave portion 22 is formed in the optical fiber pressing surface of the clamp body 21. The cushion portion 24, having the abrasion-resistant film layer 23 on its surface, is provided in the concave portion 22. In an alternative embodiment, shown in FIG. 3, the cushion portion 24 having a smooth film layer 23 on its optical fiber contact surface may be provided directly on a clamp. That is, on the side of the optical fiber pressing surface of a clamp body 25.

Figure 4:
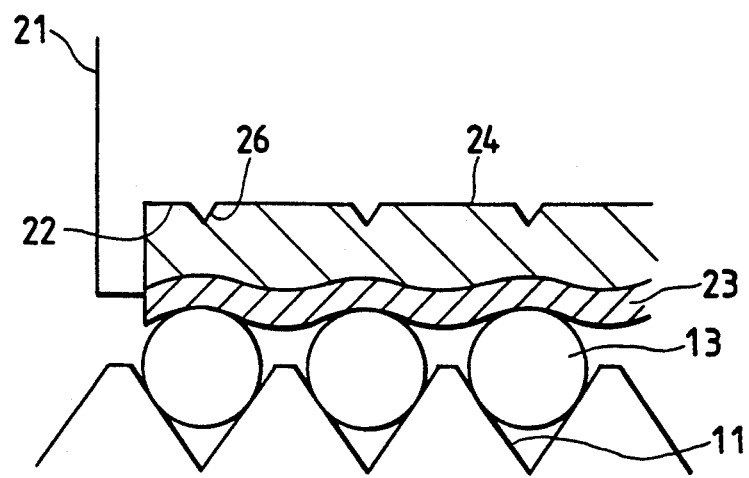
FIG. 4 is an enlarged diagram of a portion of a clamp body according to a further embodiment of the present invention.

In another embodiment, as shown in FIG. 4, projection portions 26 which correspond to the V-shaped grooves 11, respectively, may be provided in the concave portion 22 provided in the clamp body 21. This arrangement permits the optical fibers 13 to be arranged in the V-shaped grooves 11 more uniformly.

The amount of axial displacements in a batch fusion connection with the use of an optical fiber clamp of the embodiment shown in FIGS. 1 and 2 and with use of a coated 8-core tape have been measured and the results are shown below.

Figure 5A:
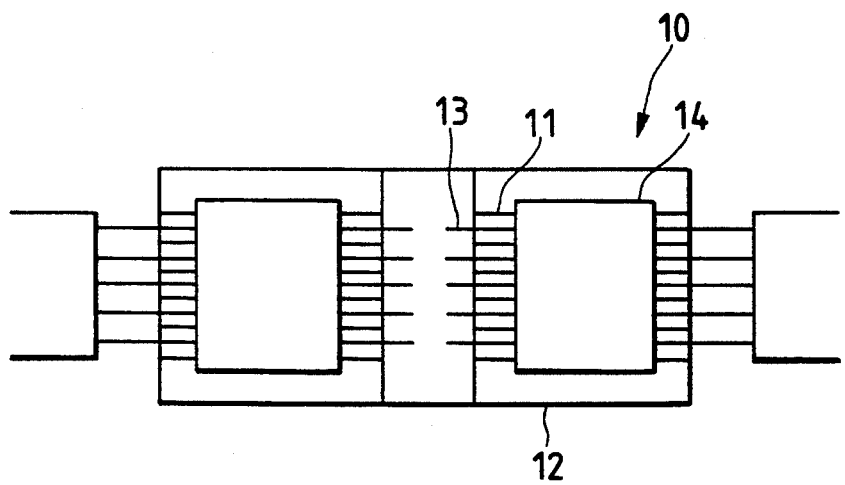
FIGS. 5(A) and 5(B) are schematic diagrams of an optical fiber clamp according to the prior art.
Figure 5B:
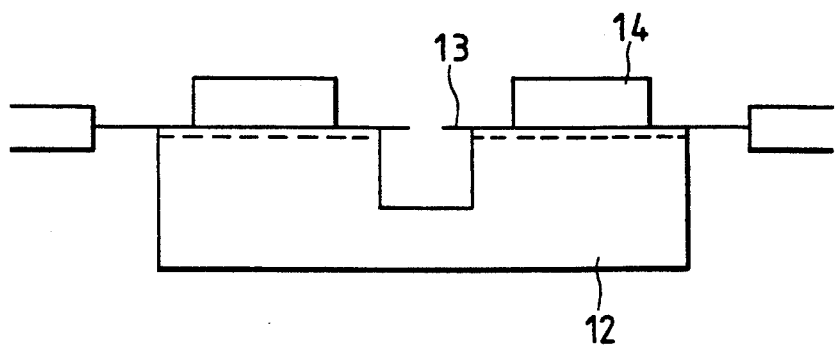

As a comparative example, a conventional optical fiber clamp as shown in FIGS. 5(A) and 5(B) and subjected to the same measurement as described above.

The results are shown in the following "Table 1". In addition, after the operations of pushing and pulling optical fibers are repeated 3,000 times by use of the optical fiber clamp according to this embodiment, the difference in the quantities of axial displacements was examined, but there was no difference observed.

TABLE 1

| Amount of axial displacement | FIGS. 1 and 2 embodiment | Comparative example (FIG. 5) |
|---|---|---|
| Max | 2 μm | 8 μm |
| Min | 0 μm | 0 μm |
| Ave | 0.8 | 3.2 |
| M | 100 | 100 |

In the optical fiber clamp according to the present invention, optical fibers are arranged and held in V-shaped grooves by means of a clamp provided with a cushion portion having an abrasion-resistant smooth film layer on its surface. With the clamp of the present invention not only is it possible to minimize the axial displacements of the respective fibers, but it is also possible to perform batch fusion on a multicore fiber with the minimum loss of connection. As a result, the optical fiber clamp according to the present invention can effectively hold optical fibers in a multicore optical fiber batch fusion and connection apparatus.

While the invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

We claim:
1. An optical fiber clamp comprising:
   (a) a first clamp body having a surface with V-shaped grooves formed therein for contacting and holding a portion of individual coated optical fibers; and
   (b) a second clamp body having an optical fiber contact surface facing said first body, said second clamp body including a cushion portion and a smooth film outer layer formed on said cushion portion, the outer layer contacting said fibers when said first and second clamp bodies are brought toward one another and said cushion portion deforming so as to compensate for varying diameters of said fibers.
2. An optical fiber clamp according to claim 1, wherein said second clamp body is formed so as to have a concave portion, said cushion portion and said smooth film layer being disposed within said concave portion.
3. An optical fiber clamp according to claim 1, wherein the smooth film layer is formed by an abrasion-resistant material.
4. An optical fiber clamp according to claim 2, wherein the smooth film layer is formed by an abrasion-resistant material.
5. An optical fiber clamp according to claim 2, wherein said concave portion of said second clamp body has a plurality of projections, which correspond to respective said V-shaped grooves of said first clamp body.
6. An optical fiber clamp comprising:
   (a) a first clamp body having a surface with V-shaped grooves formed therein for holding individual coated optical fibers; and
   (b) a second clamp body having an optical fiber contact surface facing said first body, said second clamp body including a cushion portion and a smooth film outer layer formed on said cushion portion, the outer layer coming into contact with said fibers when said first and second clamp bodies are brought toward one another, said second clamp body including a concave portion, said cushion portion and said smooth film layer being disposed in said concave portion, said concave portion of said second clamp body including a plurality of projections which correspond to respective said V-shaped grooves of said first clamp body.

* * * * *